United States Patent Office 3,251,759
Patented May 17, 1966

3,251,759
POLYMERIZATION PROCESS AND COMPOSITION

Herbert R. Anderson, Jr., Bartlesville, Okla., assignor to Phillips Petroleum Company, a corporation of Delaware
No Drawing. Filed Dec. 23, 1960, Ser. No. 77,822
11 Claims. (Cl. 204—154)

This invention relates to a polymerization process and composition. In one aspect, this invention relates to a process and composition for polymerizing polymerizable monomers in the presence of high energy radiation. In another aspect, there is provided a promoter for high energy radiation-induced polymerization of polymerizable monomers.

The use of radiation to induce polymerization has been known for some time. However, the method has not become commercially successful because of the relative inefficiency and poor yields as compared to radiation costs.

It is an object of this invention to provide an improved polymerization process and composition.

It is a further object of this invention to provide a process and composition for radiation-induced polymerization wherein an improved polymerization promoter is utilized.

Other aspects, objects and the several advantages of this invention will be apparent from a study of the disclosure and the appended claims.

I have now discovered that compounds of the formula

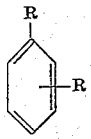

wherein each R is selected from the group consisting of

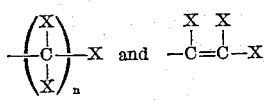

wherein each X is selected from the group consisting of H and the halogens Cl and Br, and wherein $n$ is an integer of from 1 to 3, inclusive, and wherein at least one X in each R is one of said halogens, are effective for promoting the overall polymer yield obtained by polymerization of a polymerizable monomer in the presence of high energy radiation.

The amount of the promoter will usually be added to the polymerization system in the appropriate range of 0.005 to 0.1 mol per 100 grams of the monomeric material.

The method of this invention comprises charging the material to be polymerized, together with the promoter, to a suitable reaction vessel after which it is purged with an inert gas and sealed and then subjected to high energy radiation. Diluents such as pentane, hexane, heptane, cyclohexane, methylcyclohexane, benzene, toluene, xylene, and the like can be employed, if desired. These compounds can also serve as modifiers for the polymerization and their presence can have an effect upon the properties of the polymer as they will be affected by the ionizing radiation, and such free radicals as are produced can participate in the polymerization.

The irradiation is preferably conducted by exposing the material to be polymerized to the beam of high energy electrons emitted from a linear accelerator. The linear accelerator emits a pulsing-type radiation but this invention is equally effective when the irradiation is constantly emitted. Thus, the irradiation can be conducted by placing the material to be polymerized adjacent to a spent fuel element or group of fuel elements after their withdrawal from a nuclear reactor. Irradiation can be conveniently carried out while the elements are "cooling off" in a canal filled with deionized water adjacent to the reactor.

After the materials are prepared for irradiation, they are placed in the radiation beam emitted by the linear accelerator and the dosage is set at approximately $10^3$ to $10^{10}$ roentgens per hour with the total dosage for polymerization usually being from about $10^4$ to about $10^9$ roentgens. The radiation produced by the accelerator is electrons but other types of high energy radiation, such as gamma rays, can be employed, provided the prescribed radiation intensity and dosage are utilized. The time of the radiation can vary and is governed only by the prescribed radiation rate and dosage. The polymerization of the monomer will continue until the sample is completely polymerized if the irradiation is continued.

The exact radiation dosage required for high conversion will vary with different monomers but will usually be within the range hereinbefore stated. It is believed that the general mechanism of this invention involves the absorption of radiation energy by the promoter to liberate a number of free radicals which promote chain reactions.

The temperature at which the radiation induced polymerization is carried out may vary from $-100°$ F. upward to a temperature at which thermal decomposition of the monomer, polymer or promoter occurs. Some monomers are more easily polymerized according to this invention at low temperatures.

The polymers that are produced by the proces of this invention can range from liquids to solids depending upon the total radiation dosage and the temperature at which the materials are irradiated.

In order to more fully describe my invention, the following specific examples are presented.

Example I

Samples of methyl methacrylate, methyl methacrylate and α,α′ dichloro p-xylene, and methyl methacrylate and α,α,α,α′,α′,α′ hexachloro p-xylene were irradiated with gamma rays to induce polymerization. The samples were prepared by placing in glass tubes 15 mm. in diameter and approximately 4 inches in length and sealed shut with a rubber disk, held in place with a beverage bottle cap. Through small holes in the beverage cap, needles were inserted through the rubber disk, and the air space in the sealed tube was purged with nitrogen. Table 1 shows the samples used for irradiation.

TABLE 1

|  | Sample 1 | Sample 2 | Sample 3 |
|---|---|---|---|
|  | (Parts by Weight) | | |
| Methyl methacrylate monomer (14.75 g.) | 100 | 100 | 100 |
| α,α′ Dichloro p-xylene (0.92 g.) |  | 6.23 |  |
| α,α,α,′α,′α,α′ Hexachloro p-xylene (1.65 g.) |  |  | 11.13 |

(α,α′ Dichloro p-xylene and α,α,α,α′,α′,α′ hexachloro p-xylene were present in concentrations of 3.56×10⁻² mols per hundred parts of the methyl methacrylate monomer.)

The glass tubes containing the samples were then irradiated for 1½ hours in a gamma ray field. The total dosage of the radiation to the glass tubes was $1.8 \times 10^6$ roentgens as determined by the color change in cobalt glass.

After the period of irradiation, the glass tubes were removed from the linear accelerator and the beverage caps and rubber disks were removed. Because of the viscous condition of the methyl methacrylate polymer, unreacted methyl methacrylate monomer and additive, 22 cc. acetone were added to the tubes and then the liquid mixture was poured into 250 cc. isopropyl alcohol for precipitation of the methyl methacrylate polymer. The methyl methacrylate polymer was filtered from the precipitating medium, vacuum dried and then weighted. Table 2 shows the results of the gamma ray induced polymerization.

TABLE 2

| | Weight of Polymer, g. | Percent Conversion (Based on 14.75 g. monomer) |
|---|---|---|
| Sample 1: (Methyl methacrylate with no promoter) | 3.41 | 23.1 |
| Sample 2: (Methyl methacrylate and $\alpha,\alpha'$ dichloro-p-xylene) | 4.28 | 29.0 |
| Sample 3: (Methyl methacrylate and $\alpha,\alpha,\alpha,\alpha',\alpha',\alpha'$ hexachloro-p-xylene) | 4.22 | 28.6 |

Thus, is can be seen from Example I that the monomer with the dichloro-p-xylene promoter formed 5.9 percent more polymer than the control without promoter for an increase in production of about 25 percent, and the monomer with the hexachloro-p-xylene promoter formed 5.5 percent more polymer than the control without promotor for an increase in production of about 24 percent, all samples having been exposed to the same irradiation dosage.

*Example II*

In order to determine the efficacy of other halogenated hydrocarbons as promoters for radiation-induced polymerization, 1,2-dibromoethylene was tested by the procedure of Example I. The results follow:

TABLE 3

| | Run 1 | Run 2 |
|---|---|---|
| Methyl methacrylate monomer, g | 14.75 | 14.75 |
| 1,2-dibromoethylene, g | | [1] 0.99 |
| Polymer produced, g | 4.31 | 3.87 |
| Percent conversion | 29.2 | 26.2 |
| Percent promotion [2] | | −10.3 |

[1] $3.56 \times 10^{-2}$ mols phm.
[2] Percent promotion =
$$\frac{(\text{percent conversion promoted sample} - \text{percent conversion control sample}) \times 100}{\text{percent conversion control sample}}$$

The total radiation dosage to the above samples was $4 \times 10^6$ roentgens.

*Example III*

Five other halogenated hydrocarbons were tested for their effect as promoters. The procedure used was again that of Example I. The results follow:

TABLE 4

| | Run 1 | Run 2 | Run 3 | Run 4 | Run 5 | Run 6 |
|---|---|---|---|---|---|---|
| Methyl methacrylate monomer, g | 14.75 | 14.75 | 14.75 | 14.75 | 14.75 | 14.75 |
| Cis-1,2-dichloroethylene, g | | [1] 0.52 | | | | |
| 1,2-dichloropropane, g | | | [1] 0.60 | | | |
| m-dichlorobenzene, g | | | | [1] 0.79 | | |
| 2,3-dichloropropene, g | | | | | [1] 0.59 | |
| Trichloroethylene, g | | | | | | 0.70 |
| Polymer produced, g | 4.04 | 3.58 | 3.89 | 4.17 | 3.57 | 3.91 |
| Percent conversion | 27.4 | 24.1 | 26.4 | 28.2 | 24.2 | 26.5 |
| Percent promotion [2] | | −12.0 | −3.7 | +2.9 | −12.1 | −3.3 |

[1] $3.56 \times 10^{-2}$ mols phm.
[2] Defined in Example II.

The total radiation dosage to the above samples was $4 \times 10^6$ roentgens.

It should be noted that, of the five compounds tested, only one, viz., m-dichlorobenzene, had any positive effect. This compound promoted the reaction only to the extent of 2.9 percent as compared to about 24 percent and about 25 percent promotion by two compounds of this invention tested in Example I.

*Example IV*

A run is carried out by the method of Example I in which styrene is polymerized in the presence of one of the promoters of this invention. In this run, 0.05 mol of 1,3-di(1-chloroethyl)benzene and 100 grams of styrene dissolved in 1000 grams of n-heptane are employed. The mixture is irradiated with gamma rays to a total dosage of $1 \times 10^8$ roentgens, after which the styrene polymer is recovered.

*Example V*

In another run, a mixture of 0.03 mol of 12-di(1,2-dichloroethyl)benzene and 100 grams of 2-methyl-5-vinylpyridine are irradiated with neutrons to a total dosage of $1 \times 10^7$ roentgens. Poly(2-methyl-5-vinylpyridine) is then recovered.

*Example VI*

In still another run, a mixture of 0.04 mol of 1,3-di($\alpha$-chlorovinyl)benzene and 100 mols of vinylchloride are irradiated with beta rays to a total dosage of $1 \times 10^5$ roentgens. Polyvinyl chloride is then recovered.

*Example VII*

In a further run, 0.02 mol of 1,4-di(heptachloropropyl)benzene admixed with 100 grams of acrylic acid is irradiated with X-rays to a total dosage of $1 \times 10^6$ roentgens. Polyacrylic acid is then recovered.

The yields of polymer obtained in Examples IV through VII are substantially higher than are obtained when said monomers are polymerized in the presence of said radiation and in the absence of said promoters.

Some examples of compounds of the above general formula which can be employed as promoters according to this invention are:

$\alpha,\alpha'$-Dichloro-p-xylene
$\alpha,\alpha,\alpha',\alpha',\alpha'$-Hexachloro-p-xylene
1,3-di(1-chloroethyl)benzene
1,2-di(1,2-dichloroethyl)benzene
1-(1,2,3-trichloropropyl)-4-(1,3-dichloropropyl)benzene
1,4-di(1,1,2,2,2-pentachloroethyl)benzene
1,3-di($\alpha$-chlorovinyl)benzene
1-(1,2-dichlorovinyl)-4-trichloromethylbenzene
1,4-di(heptachloropropyl)benzene and the corresponding bromine compounds.

Some examples of monomers which can be polymerized according to the process of this invention are:

Ethylene
Propylene
1-butene
Styrene
2-methyl-5-vinylpyridine
Acrylonitrile
Methyl methacrylate
Acrylic acid
Vinyl chloride
Butadiene
and the like.

Suitable temperatures and pressures will be obtained during polymerization, and will depend as known in the art upon the monomer being polymerized. Polymerization of gaseous and liquid monomers is contemplated, with the resulting polymer being formed as a solid in the the reaction zone in gaseous or liquid suspension, or as a solution in a suitable solvent.

The terminology "high energy radiation" as used herein and in the claims is intended to include generally "activating rays" or "ionizing rays" which include alpha rays, beta rays, gamma rays, X-rays, neutrons and electrons. These radiations will have an energy level within the range between 100 and $1 \times 10^8$ electron volts.

Reasonable variation and modification are possible in view of the foregoing disclosure and the appended claims to the invention, the essence of which is that there are provided a process and composition for polymerizing a polymerizable monomer in the presence of activating rays and a promoter of the formula

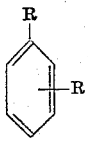

wherein R is defined above.

I claim:

1. A process comprising polymerizing a polymerizable monomer by subjecting said monomer to at least about $10^4$ roentgens of high energy ionizing radiation, said monomer being in admixture with an effective amount of a promoter comprising a compound of the formula

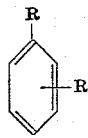

wherein each R is selected from the group consisting of

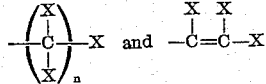

wherein each X is selected from the group consisting of H and the halogens Cl and Br, and wherein $n$ is an integer of from 1 to 3 inclusive, and wherein at least one X in each R is one of said halogens.

2. A process for polymerizing a polymerizable monomer comprising subjecting said monomer to at least about $10^4$ roentgens of high energy electrons in the present of an effective amount of a compound having the formula

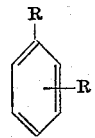

wherein each R is selected from the group consisting of

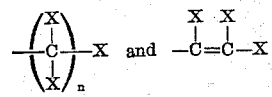

wherein each X is selected from the group consisting of H and the halogens Cl and Br, and wherein $n$ is an integer of from 1 to 3 inclusive, and wherein at least one X in each R is one of said halogens.

3. The process of claim 2 wherein said monomer comprises methyl methacrylate.

4. The process of claim 3 wherein each R is —CH$_2$Cl and is in a para position with respect to each other.

5. The process of claim 3 wherein each R is —CCl$_3$ and is in a para position with respect to each other.

6. A process for polymerizing methyl methacrylate comprising subjecting a quantity of methyl methacrylate to gamma ray irradiation for a total dosage of about $10^4$ to about $10^9$ roentgens in admixture with an effective amount of a compound selected from the group consisting of α,α'-dichloro-p-xylene and α,α,α,α',α',α'-hexachloro-p-xylene and recovering a polymerized product.

7. The process of claim 6 wherein said compound is present in the amount of about 0.005 to about 0.1 mols per 100 grams of said quantity of methyl methacrylate.

8. A process for polymerizing a polymerizable monomer comprising subjecting said monomer to at least about $10^4$ roentgens of gamma rays in the presence of an effective amount of a compound having the formula

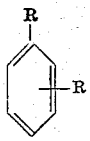

wherein each R is selected from the group consisting of

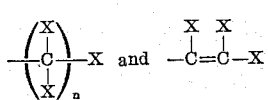

wherein each X is selected from the group consisting of H and the halogens Cl and Br, and wherein $n$ is an integer of from 1 to 3 inclusive, and wherein at least one X in each R is one of said halogens.

9. The process of claim 8 wherein said monomer comprises methyl methacrylate.

10. The process of claim 9 wherein each R is —CH$_2$Cl and is in a para position with respect to each other.

11. The process of claim 9 wherein each R is —CCl$_3$ and is in a para position with respect to each other.

References Cited by the Examiner

UNITED STATES PATENTS

| | | | |
|---|---|---|---|
| 2,505,067 | 4/1950 | Sachs et al. | 204—158 |
| 2,548,685 | 4/1951 | Sachs et al. | 204—158 |
| 2,877,445 | 5/1959 | Calfee et al. | 204—154 |
| 2,945,792 | 7/1960 | Miller | 204—154 |

OTHER REFERENCES

Martin, Chem. & Engineer. News, vol. 33 (Apr. 4, 1955), pages 1424–28.

Bovey, Effects of Ionizing Radiation on Polymers, 1958, Interscience Publishers, New York, pp. 49.

MURRAY TILLMAN, *Primary Examiner.*

J. R. SPECK, *Examiner.*

N. F. OBLON, *Assistant Examiner.*